United States Patent
Schech et al.

(10) Patent No.: US 7,721,994 B2
(45) Date of Patent: May 25, 2010

(54) HOLDER FOR INTERIOR INSTALLATIONS IN AIRPLANES

(75) Inventors: Torben Schech, Buxtehude (DE); Stephan Roepke, Wismar (DE)

(73) Assignee: Airbus Deutschland GmbH (DE)

( * ) Notice: Subject to any disclaimer, the term of this patent is extended or adjusted under 35 U.S.C. 154(b) by 276 days.

(21) Appl. No.: 11/172,469

(22) Filed: Jun. 30, 2005

(65) Prior Publication Data

US 2006/0038075 A1   Feb. 23, 2006

Related U.S. Application Data

(60) Provisional application No. 60/585,427, filed on Jul. 2, 2004.

(30) Foreign Application Priority Data

Jul. 2, 2004   (DE) .................. 10 2004 032 195

(51) Int. Cl.
 B64C 1/06 (2006.01)
(52) U.S. Cl. ................................ 244/131
(58) Field of Classification Search ............. 244/118.5, 244/129.1, 131, 117 R; 403/408.1
 See application file for complete search history.

(56) References Cited

U.S. PATENT DOCUMENTS

| | | | | |
|---|---|---|---|---|
| 2,144,782 A * | 1/1939 | Swanson | ................ | 49/130 |
| 2,917,771 A * | 12/1959 | Labrie | ................ | 16/105 |
| 3,246,363 A * | 4/1966 | Rogas et al. | ................ | 16/78 |
| 3,258,876 A * | 7/1966 | Deisenroth et al. | ............ | 49/441 |
| 3,366,199 A * | 1/1968 | Cahn | ................ | 186/40 |
| 3,999,630 A * | 12/1976 | McPhee | ................ | 186/40 |
| 4,375,876 A * | 3/1983 | Stewart | ................ | 244/129.5 |
| 5,310,017 A * | 5/1994 | Tobias | ................ | 180/291 |
| 5,720,080 A * | 2/1998 | Rose | ................ | 16/74 |
| 6,161,336 A * | 12/2000 | Ziv-Av | ................ | 49/260 |
| 6,240,860 B1 * | 6/2001 | Forchino | ................ | 111/52 |
| 2002/0039518 A1 * | 4/2002 | Schwarz | ................ | 403/329 |
| 2004/0003484 A1 * | 1/2004 | D'Assumcao | ................ | 16/91 |
| 2004/0084592 A1 * | 5/2004 | Engel et al. | ................ | 248/311.2 |

FOREIGN PATENT DOCUMENTS

| | | | |
|---|---|---|---|
| EP | 1104856 A1 * | 6/2001 | |
| EP | 1104856 B1 | 6/2001 | |
| WO | WO 9806922 A1 * | 2/1998 | |

* cited by examiner

Primary Examiner—Timothy D Collins
Assistant Examiner—Valentina Xavier
(74) Attorney, Agent, or Firm—Ostrolenk Faber LLP

(57) ABSTRACT

Nowadays, sliding bearings are usually used which apply the so-called plug-shoe principle to level-out dynamic movements of the surrounding. In this application, there is proposed a sliding bearing for airplanes comprising a frame, a carrier plate and a fast-locking element. The fast-locking element may allow for a mounting of interior installations at the sliding bearing perpendicular to the ceiling surface. Further, by means of the sliding bearing according to the invention, an unintended gliding-out of the carrier plate out of the frame may be prevented. In this way, a light and cost-effective sliding bearing may be provided, by means of which the mounting effort of interior installations is facilitated.

11 Claims, 3 Drawing Sheets

`US 7,721,994 B2`

HOLDER FOR INTERIOR INSTALLATIONS IN AIRPLANES

REFERENCE TO RELATED APPLICATIONS

This application claims the benefit of the filing date of U.S. Provisional Patent Application No. 60/585,427, filed Jul. 2, 2004, and of German Patent Application No. 10 2004 032 195.7, filed Jul. 2, 2004, the disclosure of which is hereby incorporated by reference.

FIELD OF THE INVENTION

The present invention relates to holders or mounting elements for airplanes. In particular, the present invention relates to a holder for an interior installation or an interior installation element of an airplane, and an airplane comprising a corresponding holder.

TECHNOLOGICAL BACKGROUND

In airplanes, holders or mounting elements are used for holding and mounting interior installations, as for example, ceiling coverings. In case of stiff mounting elements, it is often disadvantageous that the body of the airplane may be significantly deformed during the flight, as for example due to pressure differences. Therefore, it may appear that a considerable tension acts at the stiff mountings.

There are also known sliding bearings, by means of which coverings are mounted in interior rooms of the airplane which geometrically change during the flight, so that a stiff mounting is not possible.

Known sliding bearings use the plug-shoe principle, as it is applied in various commercial airplanes. The basis of this principle is that a holder having two opposing cupola-shaped contact areas which are elastically disposed thereon, is shifted into a plug-shoe. Within this shoe, the holder may now shift way and back, in order to level-out dynamic movements of the surrounding, as for example due to pressure differences between the/a interior region and the/a exterior region.

In order to install or remove the holder bearing the covering, it is necessary to vertically draw out the holder from out of the plug-shoe, and to possibly tilt it downwards in advance. Due to these reasons, an accordingly large amount of free space is necessary in the direction(s) of drawing-out and pivoting which is not always present. Further, this mounting does not possess an abutment in two directions so that it is possible that in extreme situations the holder unintentionally shifts out of the plug-shoe.

SUMMARY OF THE INVENTION

According to an exemplary embodiment of the present invention, a holder for an interior installation in an airplane is provided, comprising a frame having a first sliding surface and a second sliding surface, a mounting plate and a fast locking element. In this context, the mounting plate has a sliding region disposed between the first sliding surface and the second sliding surface. Further, the fast locking element is adapted to mount the interior installation.

Such holder for airplanes may allow for a simple and secure mounting of interior installations of airplanes under reduced need of space.

It is believed that by means of the fast locking element, a simple and fast mounting of an interior installation to the holder is possible. The interior installation may then be shifted with respect to its surrounding, and is connected to the surrounding by means of the holder.

In this manner, it may be possible to install and remove an interior installation substantially perpendicularly to the ceiling's surface or the cabin's surface, and not parallel thereto, as is the case for above named solutions known from the art.

According to a further exemplary embodiment of the present invention, the holder is adapted such that it may be attached to a surface by means of its mounting region, and may be mounted there. Further, the first sliding surface and the second sliding surface are disposed substantially parallel to each other, and form a slit, the width of which substantially corresponds to at least one dimension of the sliding region.

The mounting region may allow for a simple mounting. In this context, the holder may at first be firmly mounted to a skin-surface or ceiling-surface or at a mounting element. Subsequently, an interior installation element is then mounted to the holder by means of a fast locking mechanism. By means of the formation of a sliding slit, in which the sliding region is supported, a simple and reliable sliding mechanism may be provided, which operates without need of maintenance also after a operation time of many years.

According to a further exemplary embodiment of the present invention, the holder further comprises a biasing element for creating a biasing tension or force between frame and support plate in the region of the first sliding surface, the second sliding surface and the sliding region, wherein an adherence force or friction force between the sliding region and the first and second sliding surface may be adjusted in varying the biasing tension by means of the biasing element.

By means of the biasing element, the adherence force or friction force between the sliding surfaces and sliding region may be adjusted in such a manner that, to the one hand, a sufficiently stiff mounting of the interior installation may be secured, and on the other hand, the interior installation is still supported in a sufficiently slideable manner, so that deformations of the fuselage body during the flight may be balanced out sufficiently, without any excess tensions resulting. By using a biasing element, there is no further need for an inherent bias tension, i.e. one which may already given by the respective manufacturing of the holder. Accordingly materials may now be used for the holder which are not very stiff, like for example sheet metal or comparably thin aluminum profiles. Thereby, production costs and material costs may be saved, and the weight of the sliding bearing may be reduced.

According to another exemplary embodiment of the present invention, the sliding region has a first recess, and the frame has a second recess. The perimeter of the first recess is larger than the perimeter of the second recess. The biasing element extends through both recesses, and is connected with the frame, so that the frame may be shifted with respect to the carrier plate within a region defined by the larger perimeter.

This may allow to reduce tolerances and to connect frame and carrier plate to each other in such a manner that they cannot shift off each other. The perimeter of the recess in the support plate is larger by the intended tolerance way than the perimeter of the biasing element. In this way, the biasing element is moveable within the recess in the sliding region of the support plate, without the holder being able to leave its predefined position.

According to a further exemplary embodiment of the present invention, the biasing element is embodied in the form of a screw, a rivet or a bolt, and the fast locking element is embodied in form of a spring clip for receiving a pin.

According to this exemplary embodiment, the pin may, for example, be disposed at an interior installation. It is therefore possible to connect the interior installation with the holder in a simple manner, in that the pin is plugged into the fast locking element. The movement necessary for this is effected perpendicularly to the holder, and thereby also perpendicularly to the wall surface or ceiling surface, so that a simple mounting is also possible, when space conditions are extremely limited.

According to a further advantageous exemplary embodiment of the present invention, the interior installation is a covering or cladding which during the flight operation changes its position and form with respect to its surrounding. Accordingly, it is possible to mount interior room ceiling plates, which are used to cover for example the passenger region within the airplane skin, to the exterior skin in a sliding manner.

According to a further exemplary embodiment of the present invention, the mounting region is disposed at a mounting plate, and the fast locking element is mounted to the frame. The mounting plate may thereby be permanently mounted to a respective wall region of the airplane's skin. Subsequently, during the final mounting, a simple mounting of an interior installation at the frame may be possible. This may allow that, for example during a converting, the frame may be changed quickly and without problems by simply loosening the pin out of the fast locking element, removing the interior installation and subsequently removing the biasing element.

Moreover, at the mounting region, there is provided a third recess for mounting the holder at the surface, as for example a carrier, by means of a screw, a rivet or a self locking plug-in bolt.

Thus, a holder may be provided which is mountable in a simple manner. To this end, the mounting region may additionally possess a profiling, for example in form of a claw element being plugged onto a rectangular section of the carrier. In doing so, the claw element may, for example, be embodied in such a manner that, by means of this plugging-on, the sliding bearing is held at the holder already in such a way that its own weight is held. In order to finally mount the holder, the holder may then be fixed at the carrier by means of the screw, rivet or self locking plug-in bolt or by similar means.

According to a further exemplary embodiment of the present invention, the holder has a sliding coating in the region of the first sliding surface and the second sliding surface, so that the frame and the support plate may be moved with respect to each other in a sliding manner with a substantially constant friction resistance. This frictional resistance is independent of the surface pressing and thereby is adjustable by means of the biasing force which, for example, may be generated by means of the biasing element.

According to a further exemplary embodiment of the invention, the sliding coating has an elastic component, so that spatially varying tensions between frame and support plate region of the first sliding surface, the second sliding surface and the sliding region may be leveled-out. It is therefore possible, for example, to compensate non-parallel alignments of the two sliding surfaces as they may result, for example, from imprecise manufacturing or deformation of the frame. Therefore, production costs and weight of the holder may be reduced.

BRIEF DESCRIPTION OF THE DRAWINGS

In the following, the invention will be described on the basis of exemplary embodiments and by reference to the drawings.

Figure 1:
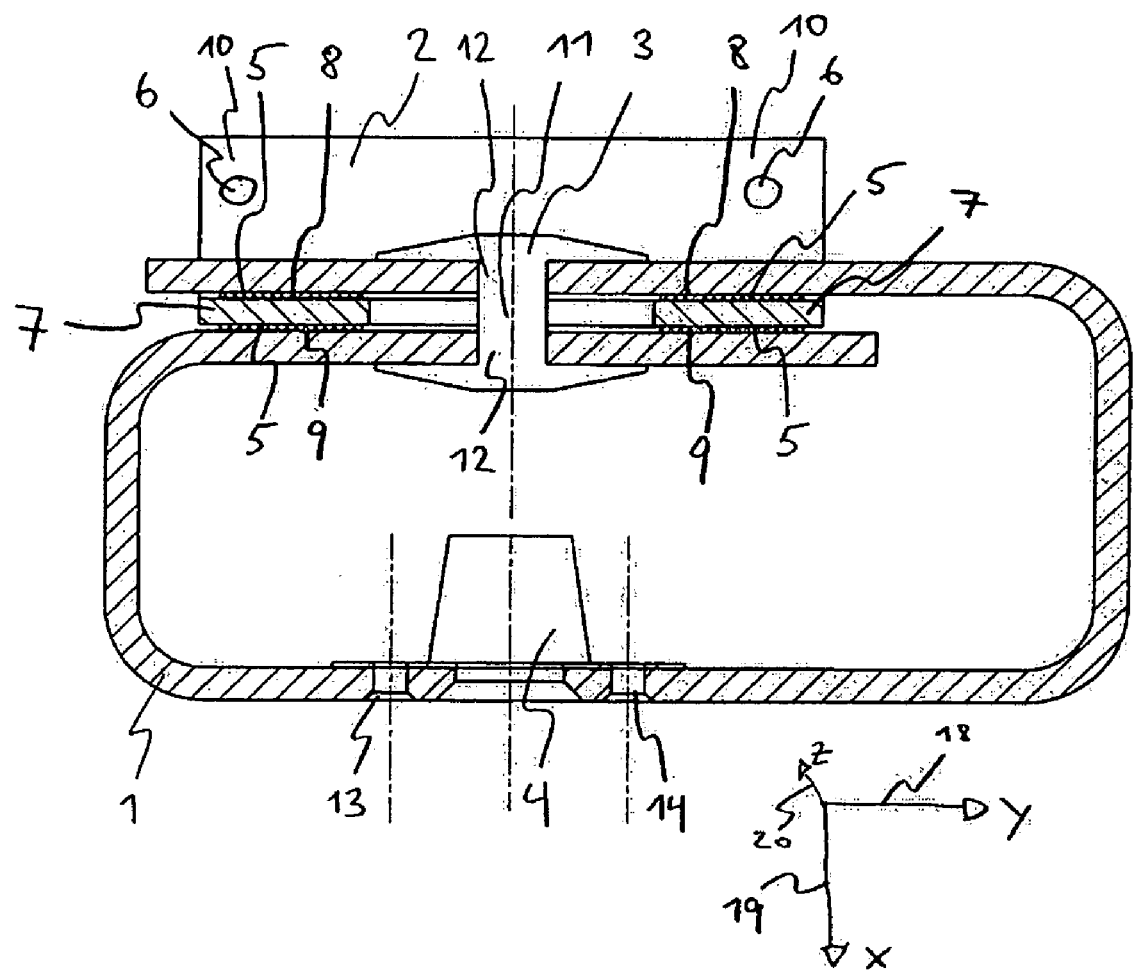
FIG. 1 shows a schematic sectional view of a holder according to an exemplary embodiment of the present invention.

DESCRIPTION OF PREFERRED
EMBODIMENTS OF THE INVENTION

In the following description of figures, the same reference numerals are applied for the same or similar elements.

FIG. 1 shows a first schematic sectional view of a holder for an interior installation in an airplane according to an exemplary embodiment of the present invention. As may be learned from FIG. 1, the holder, being embodied in form of a sliding bearing, has a frame 1, a carrier plate 2 and a biasing element 3. The biasing element 3 is adapted to create a bias tension between the frame 1 and the biasing plate 2 in the region of a first sliding surface 8, a second sliding surface 9 and a sliding region 7. The sliding region 7, being a part of the carrier plate 2, is disposed between the first sliding surface 8 and the second sliding surface 9 of the frame 1. In varying the bias tension by means of the biasing element 3, a holding force or friction force between the sliding region 7 and the first and second sliding surfaces 8,9 may be adjusted.

To this end, according to an embodiment of the present invention, the biasing element is, for example, embodied in form of a screw. The screw 3 is thereby led through a first recess 11 of the sliding region 7 and a second recess 12 of the frame 1, and may press the two sliding surfaces 8,9 against the sliding region 7 of the carrier plate 2, for example in cooperating correspondingly with a nut (not shown in FIG. 1).

Further, the carrier plate 2 comprises a mounting region 10 comprising a recess 6 serving to mount the sliding bearing to a surface, for example by means of a screw, rivet or a self locking plug-in bolt.

Further, according to the embodiment of the present invention shown in FIG. 1, a sliding coating 5 is provided, which is respectively mounted in the interspaces between the first sliding surface 8 and the sliding region 7, and the second sliding surface 9 and the sliding surface 7.

In order to mount interior installations (not shown in FIG. 1) at the sliding bearing, a fast locking element 4 is provided, which is mounted to the frame by means of mountings 13,14. The mountings 13,14 may, for example, be screws, rivets, or plug-in bolts. An adhesive joint or welding connection or the like might be thought of as well though, by means of which the fast locking element 4 is connected to the frame 1 in a persistent and firm manner.

The frame 1 is embodied in such a manner that it possesses two parallel sliding surfaces 8,9 which form a slit, the width of which substantially corresponds to the dimensions of the sliding region 7. According to an exemplary embodiment of the present invention, the carrier plate 2, the sliding region 7 of which is supported in a sliding manner within the slit formed by the frame, is mounted to a support element, as for example a carrier being a component of the body of the airplane. Since the frame 1 is connected to the support plate 2 by means of the sliding surfaces 8,9 only, it can only move in the plane of the sliding surfaces 8,9, and thereby advantageously can level out dynamical movements of the surrounding which may occur, for example, as a consequence of a deformation of the body due to high pressure differences or temperature variations between an inner region and an outer region of the airplane.

The frame 1 which is connected to the carrier 2 in a sliding manner, thereby also serves for mounting an interior installation by means of the fast locking element 4. To this end, the fast locking element 4 may, for example, be embodied in form of a spring clip for receiving a pin. In doing so, the pin is firmly connected to the interior installation, so that a fast and simple mounting of the interior installation (not shown in FIG. 1) at frame 1 is possible. Of course, other embodiments of the fast locking element 4 may be thought of as well, as for example so called quick release fasteners or quick release lathes, as they are well known in the state of the art.

The mounting of the interior installation at the frame 1 is effected preferably in a direction substantially perpendicular to frame 1, symbolised by arrow 19 in FIG. 1. Therefore, interior covering elements or ceiling covering elements may also be installed or removed if there is no free space at all in a direction parallel to the sliding bearing (defined by a Y-Z-plane, spanned by arrows 18, 19), since for example the respective ceiling covering part is closely surrounded by other components in all directions. By means of the advantageous embodiment of the fast locking element, for example in form of a spring-clip, it is further secured that the mounting mechanism between frame 1 and covering part may be operated in a simple and fast manner, and may nonetheless provide a secure hold. Thereby, the mounting of interior installations at the sliding bearing is considerably facilitated.

Therefore, the carrier plate 2 may be permanently mounted to a carrier. Subsequently, during the final mounting, a simple mounting of an interior installation at the frame 1 is possible. By simply loosening the pin from out of the fast locking element, removal of the interior installation and subsequent removal of the biasing element, the frame 1 may be exchanged quickly and without problems at a later point in time, during a conversion or maintenance.

In order to facilitate the mounting, the mounting region 10 may for example have an additional profiling in form of a claw element (not shown in FIG. 1), which is plugged onto a rectangular section of the carrier. The claw element may thereby be embodied in such a way that the sliding bearing is already held at the carrier in such a manner that its own weight is held. For final mounting of the sliding bearing, the sliding bearing may then be fixed at the carrier by means of the screw, rivet or self-locking plug-in bolts or similar means.

In this respect, it shall be taken into consideration that the mounting region 10 may of course also be disposed at the frame, in order to obtain a firm mounting of the sliding bearing. Further, the fast locking element 4 may accordingly be disposed at the carrier plate 2, so that at first the frame 1 is firmly connected to the supporting component, which may for example be effected by means of a screwing or riveting, and subsequently, the interior installation, which is to be supported in a slideable manner, then is connected to the carrier plate 2 by means of the fast locking element 4. One of the two components, frame 1 or carrier plate 2, is fixedly connected to the surrounding, for example a carrier, and that the respective other component is connected to the respective interior installation, so that the interior installation is supported in a slideable manner with respect to the surrounding. In doing this, the connection with the interior installation is advantageously effected by means of a mechanism which may easily be actuated and is operated perpendicularly to the sliding bearing (which means in X-direction 19).

In order to limit the tolerances or the tolerance ways, and in order to connect the frame 1 and the carrier plate 2 to each other in such a way that they cannot slide off each other, they are for example connected by means of a screw 3 (biasing element). The radius of the bore for the screw 3 in the carrier plate 2 is larger by the intended tolerance way than the radius of the screw 3. In this manner, the screw 3 is moveable within the bore of the carrier plate 2, without the sliding bearing leaving its predefined position. Of course, the recesses 11 in the frame 1 may also be embodied in form of milled-out regions or the like, which may take any arbitrary form. Preferably, the form of the recesses 11 in the frame 1 reflects the cross section of the biasing element 3, so that the biasing element 3 may be plugged through the recesses 12, and be fixed there.

The further recess 11 in the carrier plate 2 has, as already shown, a greater perimeter than the recesses 12 in frame 1. It is to be taken into consideration here as well, that the form of the recess 11 does not necessarily have to possess a round form. Rather, many different forms may be thought of, as for example an oval form or a rectangular form. Thereby, the form of the recess 11 within the carrier plate 2 defines the area, in which the carrier plate 2 is mounted in a slideable manner with respect to the frame 1. In this context, the displaceability between carrier plate 2 and frame 1 is limited, to the one hand, by the perimeter of the recess 11, and to the other hand by the biasing element 3 penetrating through the recess 11 and being fixedly connected to the frame 1.

In varying the bias by means of the biasing element 3, the holding force or friction force between the frame 1 and the carrier plate 2 may be adjusted. For example, in shortening the biasing element 3, the slit width between the first sliding surface 8 and the second sliding surface 9 may be reduced, so that the sliding region 7 of the carrier plate 2 is more firmly pressed against the sliding surfaces 8 and 9. Thereby, an increase of the adherence force or friction force, respectively, between the surfaces 8,9 and the sliding region 7 is effected.

Sliding surfaces 8,9 and sliding area 7 may thereby posses a sliding coating 5, so that the frame 1 and the carrier plate 2 are supported with a mostly constant friction resistance with respect to each other in a sliding manner. The sliding coating may for example be in form of a teflon (PTFE) coating, which is fixedly applied onto the carrier plate 2, in order to reduce the friction between itself and the frame 1. According to an exemplary embodiment of the present invention, the sliding coating 5 has an elastic component, in that the PTFE is, for example, embedded into a synthetics foam, to thereby level out irregularities of the surface alignments between the sliding surfaces 8,9 and the sliding region 7. Of course, the sliding coating may also consist of other materials or material mixtures, as for example lubricating substances containing graphite or the like.

In that the sliding coating 5 is applied onto the carrier plate 2, it is secured that the frame 1 and the carrier plate 2 are mounted with respect to each other in a slideable manner with a mostly constant friction resistance. This friction resistance depends on the surface pressing, for example, and therefore is adjustable by means of the bias tension of the biasing element 3.

If the frame 1 is, for example, a sheet bending part, there may arise irregularities between the two sliding surfaces 8,9 as a consequence of inaccuracies of manufacturing or as a consequence of deformations. As a consequence of a bending, there may further arise the case that the two sliding surfaces 8,9 are not disposed parallel to each other. In order to compensate for this, according to an advantageous embodiment of the present invention, the sliding bearing is designed to be elastic, so that varying tensions between the sliding surfaces may mostly be leveled-out to a large extent.

Figure 2:
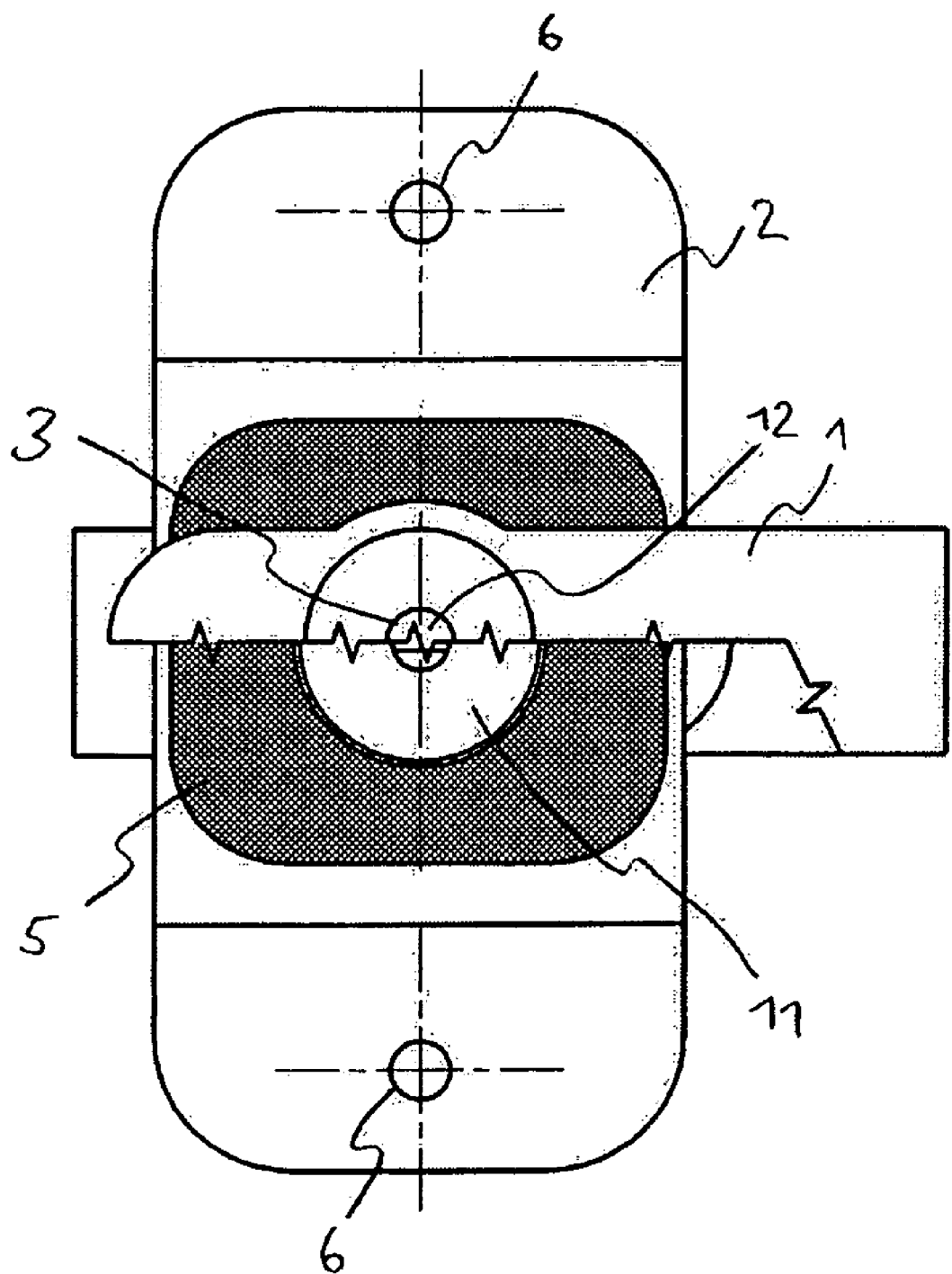
FIG. 2 shows a partially cut schematic plan view of the holder according to FIG. 1.

FIG. 2 shows a schematic, partially cut plan view of the sliding bearing according to FIG. 1. As may be learned from FIG. 2, in the present exemplary embodiment, the recess 11 in the carrier plate 2 of the sliding bearing is round. Further, the biasing element 3 leads through the second recess 12 of the frame 1 has a round cross-section, so that, as a consequence, a circular surface for shifting the frame 1 with respect to the carrier plate 2 is provided.

As can be seen in FIG. 2, the region, across which the frame 1 and the carrier plate 2 rub at each other in a sliding manner is provided with a sliding coating 5, so that a mostly constant friction resistance is secured. Recesses 6 in the mounting regions for attachment to a carrier are thereby embodied in form of bores, which may easily be introduced when manufacturing the sliding bearing. Therefore, the sliding bearing may be firmly connected with the carrier, for example by means of screwing connections being lead through the bores 6. For example, screw to nut connections may be provided as screwing connections, but clip-nut connections or clips may be used as well.

Of course, rivet-connections, welding connections, gluing connections or the like may be thought of as well.

A plurality of further recesses 6 may also be provided.

Figure 3:
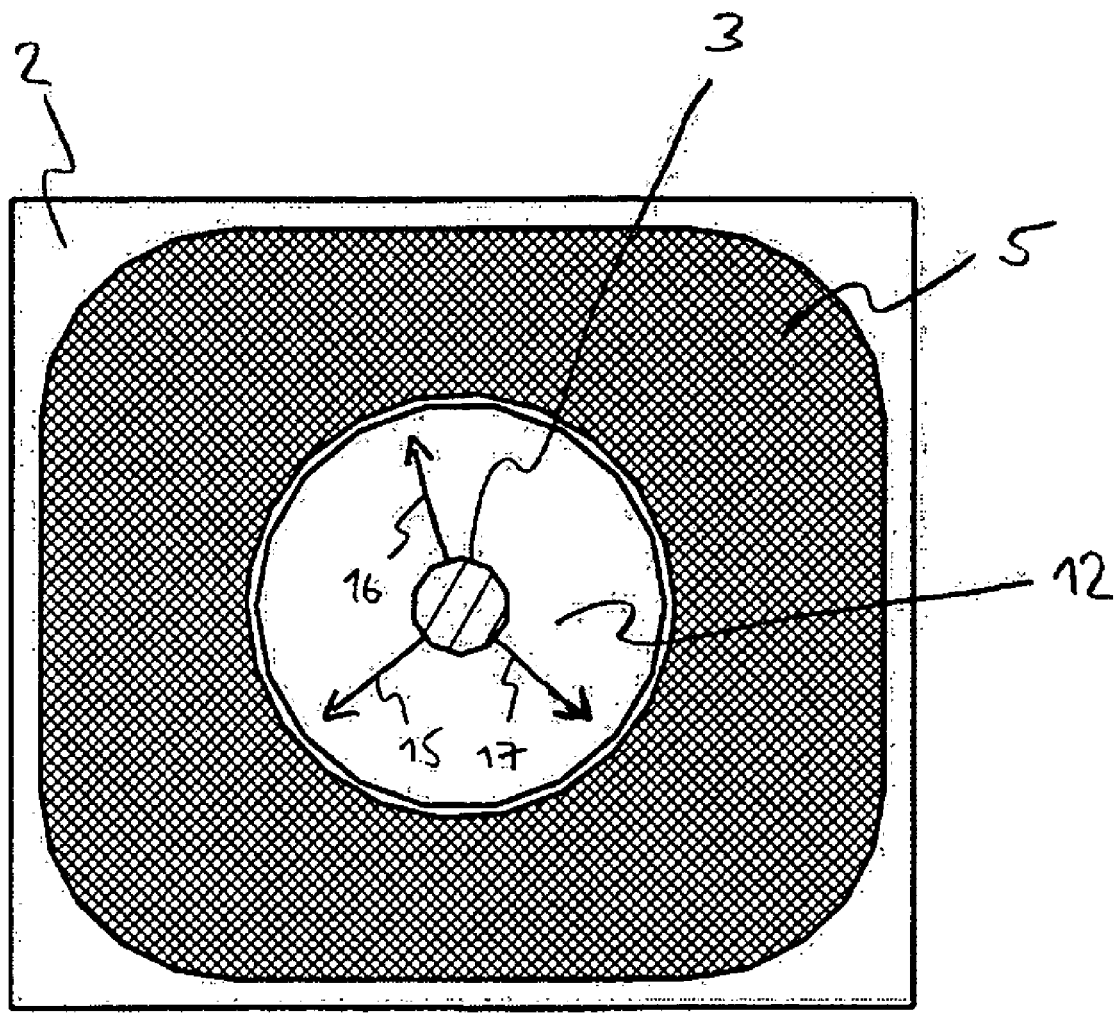
FIG. 3 shows a second schematic sectional view of the holder according to FIG. 1.

FIG. 3 shows a second schematic sectional view of the sliding bearing of FIG. 1, wherein the sliding region 7 of the carrier plate 2 and the cross section of the biasing element 3 are represented. The biasing element 3 which is firmly connected with the frame 1 (not to be seen in FIG. 3) may freely move within the recess 12 in all plane spatial directions (represented by arrows 15, 16, 17) as is represented in FIG. 3. In this context, surface-related movement means a movement in the Y-Z-plane, spanned by arrows 18, 20. The X-direction which is indicated by arrow 19 extends perpendicularly to the Y-Z-plane, and is the direction, in which the interior installation is mounted at the frame 1 of the sliding bearing by means of the fast locking element 4 (see FIG. 1). In this context, the recess 12, in cooperation with the cross section of the biasing element 3, defines the region, where the frame 1 and the carrier plate 2 may move with respect to each other. A moving outside this region is not possible, since this is prevented by the biasing element 3 extending perpendicularly through the recess 12. Therefore, in all directions within the Y-Z-plane defining the plane of movement of the sliding bearing, there is provided an abutment, so that it is not possible, that the frame 1 slides off the carrier plate 2.

The application of the invention is not limited to the preferred embodiments shown in the figures. Rather, a plurality of variants may be thought of, which make use of the shown solution and the principle according to the invention, in case of embodiments of principally different kind as well.

In addition, it should be noted that "comprising" does not exclude other elements or steps, and that "a" does not exclude a plurality. Further, it shall be noted that features or steps which are described referring to one of the above exemplary embodiments may also be used in combination with other features or steps of other above described exemplary embodiments. Reference signs are not to be seen as restrictions.

What is claimed is:

1. Holder for an interior installation in an airplane, comprising:
   a movable frame having a first sliding surface and a second sliding surface spaced apart and facing each other;
   a carrier plate fixedly mounted in the airplane, the carrier plate being immovable with respect to the airplane, the carrier plate having a first portion disposed between the first sliding surface and the second sliding surface of the movable frame, the movable frame being movable relative to the first portion of the carrier plate such that the first and second sliding surfaces slide over the first portion;
   a fast locking element positioned on the frame and configured to hold the interior installation; and
   a biasing element operable to bias the frame to the carrier plate in a region of the first sliding surface, the second sliding surface and the first portion of the carrier plate, one of an adhering force and a friction force between the first portion of the carrier plate and the first and second sliding surfaces being adjustable by varying a bias of the biasing element,
   wherein the first portion of the carrier plate includes a first recess;
   wherein the frame includes a second recess;
   wherein the first recess has a larger perimeter than the second recess; and
   wherein the biasing element extends through the first and second recesses and is connected to the frame such that the frame is slidably movable relative to the first portion of the carrier plate, movement of the frame being constrained to a region defined by the larger perimeter.

2. The holder of claim 1, further comprising:
   a mounting region configured to attach the holder to a surface of the airplane; and
   a slit defined between the spaced apart first and second sliding surfaces, the first sliding surface and the second sliding surface being disposed substantially parallel to each other,
   wherein a width of the slit corresponds to a dimension of the first portion of the carrier plate disposed between the first and second sliding surfaces.

3. The holder of claim 1,
   wherein the biasing element comprises one of a screw, a rivet and a bolt between the frame and the carrier plate; and
   wherein the fast locking element comprises a spring clip for receiving a pin of the installation.

4. The holder of claim 1,
   wherein the interior installation comprises a covering which changes its position or form with respect to its surrounding during a flight operation of the airplane.

5. The holder of claim 2,
   wherein the mounting region is disposed at the carrier plate; and
   wherein the fast locking element is mounted to the frame.

6. The holder of claim 1, further comprising:
   a sliding coating applied to each of the first sliding surface and the second sliding surface such that first portion of the carrier plate is sandwiched between the sliding coating applied to the first sliding surface and the sliding coating applied to the second sliding surface, the sliding surfaces of the frame and the first portion of the carrier plate being supported in a sliding manner with a constant friction resistance with respect to each other.

7. The holder of claim 6,
   wherein each sliding coating comprises an elastic component configured to level-out spatial variability of tensions formed between the sliding surfaces of the frame and the first portion of the carrier plate so as to enable smooth sliding of the sliding surfaces.

8. Airplane, comprising the holder of claim 1.

9. The holder of claim 1,
   wherein the carrier plate has an L-shaped profile.

10. The holder of claim 1,
    wherein the slidably movable frame is movable in a plane defined by the first and second sliding surfaces of the frame.

11. The holder of claim 1,
    wherein the first portion of the carrier plate is sandwiched between the first sliding surface and the second sliding surface of the frame.

* * * * *